United States Patent
Kuroda et al.

(10) Patent No.: US 9,927,536 B2
(45) Date of Patent: Mar. 27, 2018

(54) RADIATION DETECTION APPARATUS AND RADIATION DETECTION METHOD

(71) Applicant: Kabushiki Kaisha Toshiba, Minato-ku (JP)

(72) Inventors: Hidehiko Kuroda, Yokohama (JP); Kunihiko Nakayama, Tama (JP); Kei Takakura, Yokohama (JP); Mikio Izumi, Yokohama (JP); Naoto Kume, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 203 days.

(21) Appl. No.: 14/496,081

(22) Filed: Sep. 25, 2014

(65) Prior Publication Data

US 2015/0090889 A1    Apr. 2, 2015

(30) Foreign Application Priority Data

Sep. 30, 2013   (JP) .................. 2013-205124

(51) Int. Cl.

| G01T 1/205 | (2006.01) |
| G01J 1/42 | (2006.01) |
| G01T 1/20 | (2006.01) |
| G01T 1/169 | (2006.01) |
| G01J 1/44 | (2006.01) |

(52) U.S. Cl.
CPC .............. *G01T 1/2002* (2013.01); *G01J 1/42* (2013.01); *G01T 1/169* (2013.01); *G01T 1/205* (2013.01); *G01T 1/2006* (2013.01); *G01T 1/2018* (2013.01); *G01J 1/429* (2013.01); *G01J 2001/444* (2013.01)

(58) Field of Classification Search
CPC .............................. G01T 1/2002; G01T 1/205

USPC ......................... 250/362, 368, 372
See application file for complete search history.

(56) References Cited

U.S. PATENT DOCUMENTS 6,281,502 B1    8/2001  Pineau et al.

FOREIGN PATENT DOCUMENTS

| EP | 1 944 626 A2 | 7/2008 |
| JP | 56-88160 | 7/1981 |
| JP | 2000-88966 | 3/2000 |

(Continued)

OTHER PUBLICATIONS

F. Lamadie et al. "Remote Alpha Imaging in Nuclear Installations: New Results and Prospects", IEEE Transactions on Nuclear Science, vol. 52, No. 6, Dec. 2005, 5 pages.

(Continued)

*Primary Examiner* — David Porta
*Assistant Examiner* — Carolyn Igyarto
(74) *Attorney, Agent, or Firm* — Oblon, McClelland, Maier & Neustadt, L.L.P.

(57) ABSTRACT

A radiation detection apparatus includes a selecting unit that allows a light having a light emission wavelength and a polarization direction to pass thorough the selecting unit, an optical system that forms an image of the light, a photon detecting unit that observes the image formed by the optical system, and detects the photon in whole range of the entire image, a counting unit that calculates the number of the alpha rays based on a result of counting the photons derived from the light emission of gas excited by the alpha rays, whereby it is possible to sufficiently eliminate background light (noise light) even if background light is strong, and therefore observe weak light emission.

11 Claims, 5 Drawing Sheets

(56) References Cited

FOREIGN PATENT DOCUMENTS

| JP | 2000-507698 | 6/2000 |
| JP | 2008-209288 | 9/2008 |
| WO | WO 99/60420 A1 | 11/1999 |
| WO | WO 03/101528 A2 | 12/2003 |

OTHER PUBLICATIONS

Extended European Search Report dated Mar. 19, 2015 in Patent Application No. 14187142.6.
J. Sand et al. "Remote Optical Detection of Alpha Radiation", IAEA-CN-184/23, Nov. 4, 2010, 6 pages.

RADIATION DETECTION APPARATUS AND RADIATION DETECTION METHOD

BACKGROUND OF THE INVENTION

Field of the Invention

The present invention relates to a radiation detection apparatus and a radiation detection method.

Description of the Related Art

It is well known that a survey meter provided with a zinc sulfide (ZnS) scintillator is an example of a general alpha ray (α ray) detector. Since the survey meter needs to scan an object to be scanned in a state where a sensing (detecting) unit of the survey meter is brought close to a surface of the object to be scanned, it takes much time and effort for detecting alpha rays.

Meanwhile, it is well known that an ultraviolet (UV) ray is emitted if an alpha ray excites a nitrogen molecule. The ultraviolet ray emission phenomenon derived from a nitrogen molecule excited by alpha ray is applied to a radiation detection apparatus that detects alpha rays. For example, an alpha ray detection apparatus which detects alpha rays based on an image obtained by remotely observing luminous image of nitrogen is described in a non-patent document "F. Lamadie et. al., Remote Alpha Imaging in Nuclear Installations: New results and Prospects, IEEE TRANSACTION ON NUCLEAR SCIENCE, Vol. 52, No. 6, December (2005)".

FIG. 8 is an explanatory view illustrating a configuration example of a conventional radiation detection apparatus that detects alpha rays by observing a luminous image of nitrogen.

The radiation detection apparatus 100 includes a collecting lens 101 that collects (condenses) light emitted in a luminous region (light emission region) 1 of nitrogen, a wavelength selecting unit 102 that selects luminous wavelengths (emission wavelengths) of nitrogen from the light emitted by the collecting lens 101, an imaging unit 103 that is provided with a CCD (charge coupled device) having a cooling function and imaging the light emission of a wavelength selected by the wavelength selecting unit 102, and an image processing unit 104 that extracts the image of the luminous region 1 of nitrogen in which an alpha ray causes the light emission from the image imaged by the imaging unit 103 and displays the extracted image.

In the radiation detection apparatus 100, light in the luminous region 1, including the light emission (UV light) caused by alpha ray and background light as noise, is collected by the collecting lens 101, and then guided to the wavelength selecting unit 102. The wavelength selecting unit 102 extracts the UV light caused by alpha ray by eliminating the background light (noise) from the guided (introduced) light, and then transmits to the imaging unit 103. The imaging unit 103 forms (images) the image of the luminous region 1 of nitrogen on an acceptance surface.

The imaging unit 103 transmits the image, of light emission (luminous region 1) of nitrogen to the image processing unit 104. The image processing unit 104 extracts the image of luminous region 1, colors the extracted image, and displays the colored image on a display element such as a display or monitor. Although some noise is caused from thermal excitation in the imaging unit 103, the imaging unit 103 has cooling function and it is therefore possible to suppress the thermal excitation noise.

In such a way, the radiation detection apparatus 100, which is one example of conventional radiation detection apparatus to detect alpha ray by observing luminous image of nitrogen, makes it possible to observe nothing but luminous image of nitrogen caused by alpha ray and to detect alpha rays.

However, there is a case where it is difficult for the conventional radiation detection apparatus to detect light emission (luminous image) of nitrogen caused by alpha rays. For details, the light emission of nitrogen caused by alpha rays occur at the photon level, and is therefore very weak in luminescence. Accordingly, when background light (noise light) is strong, even if the wavelength selecting unit is used for detecting alpha rays in the conventional radiation detection apparatus, it is difficult for the conventional radiation detection apparatus to extract nothing but the light emission of nitrogen by eliminating the background light from collected light which includes the light emission of nitrogen and the background light. That is, when background light (noise light) is strong, it is difficult for the conventional radiation detection apparatus to sufficiently eliminate the background light and to thereby extract nothing but the light emission of nitrogen.

SUMMARY OF THE INVENTION

The present invention has been devised in view of such circumstances, and an object thereof is to provide a radiation detection apparatus and a radiation detection method that is possible to observe nothing but the light emission (luminous image) of nitrogen by sufficiently eliminating background light (noise light) even if background light is strong.

In order to achieve the object described above, the radiation detection apparatus according to an embodiment of the present invention includes: a wavelength selecting unit that passes light having a selected wavelength from a light emission of gas excited by an alpha ray; a first polarization selecting unit that receives the light passed by the wavelength selecting unit, selects a polarization direction, and passes a light of the selected polarization direction; an optical system that forms an image of the light passed through the wavelength selecting unit and the first polarization selecting unit;

a photon detecting unit that detects photons in the image formed by the optical system;

a counting unit that counts the photons detected by the photon detecting unit, identifies the photons derived from the light emission of gas excited by the alpha ray based on a value obtained from a result of counting the detected photons, counts the identified photons, and calculates the number of the alpha rays based on a result of counting the identified photons.

Further, in order to achieve the object described above, a radiation detection method according to an embodiment of the present invention includes: selecting a wavelength when a gas excited by an alpha ray emits a light; selecting a polarization direction; forming an image of a light having the selected wavelength and the selected polarization direction selected from the light emitted by the excited gas; detecting photons in the image; counting the detected photons; identifying the photons derived from the light emitted by the excited gas based on a value obtained from a result of counting the detected photons; counting the identified photons; and calculating the number of the alpha rays based on a result of counting the identified photons.

According to the present invention, it is possible to sufficiently eliminate background light (luminous image)

from image to be observed even if background light (noise light) is strong, and to therefore observe nothing but the light emission of nitrogen.

DETAILED DESCRIPTION OF THE PREFERRED EMBODIMENTS

Radiation detection apparatus and radiation detection method according to embodiments of the present invention will be described below with reference to the accompanying drawings.

First Embodiment

Figure 1:
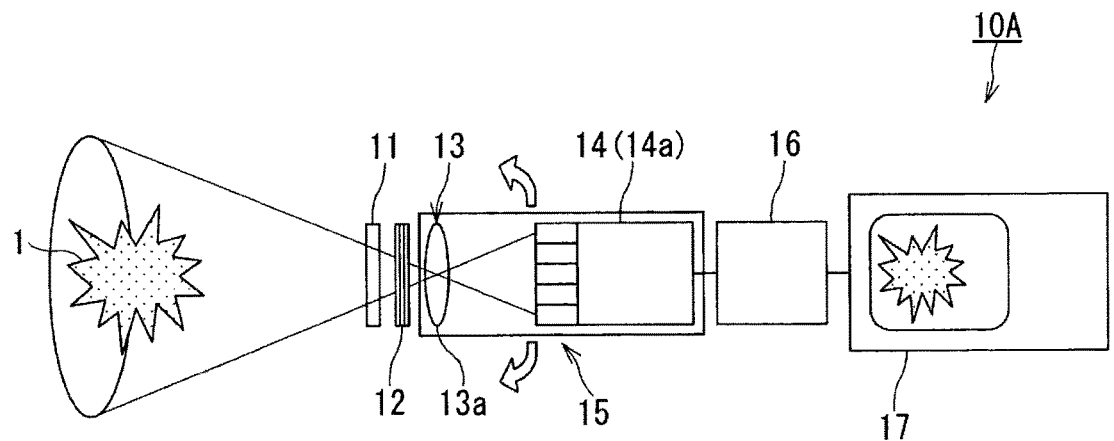
FIG. 1 is a schematic view illustrating an example of a radiation detection apparatus according to first embodiment of the present invention.
Figure 2:
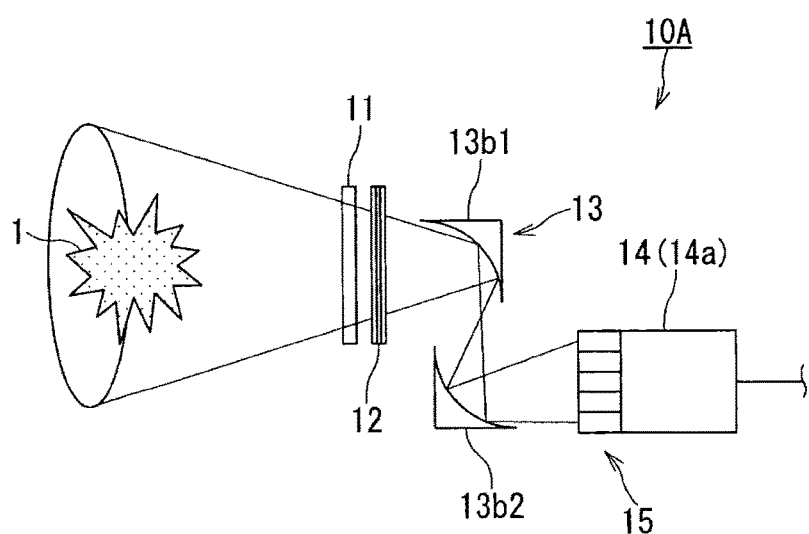
FIG. 2 is a schematic view illustrating another example of the radiation detection apparatus according to first embodiment of the present invention.
Figure 3:
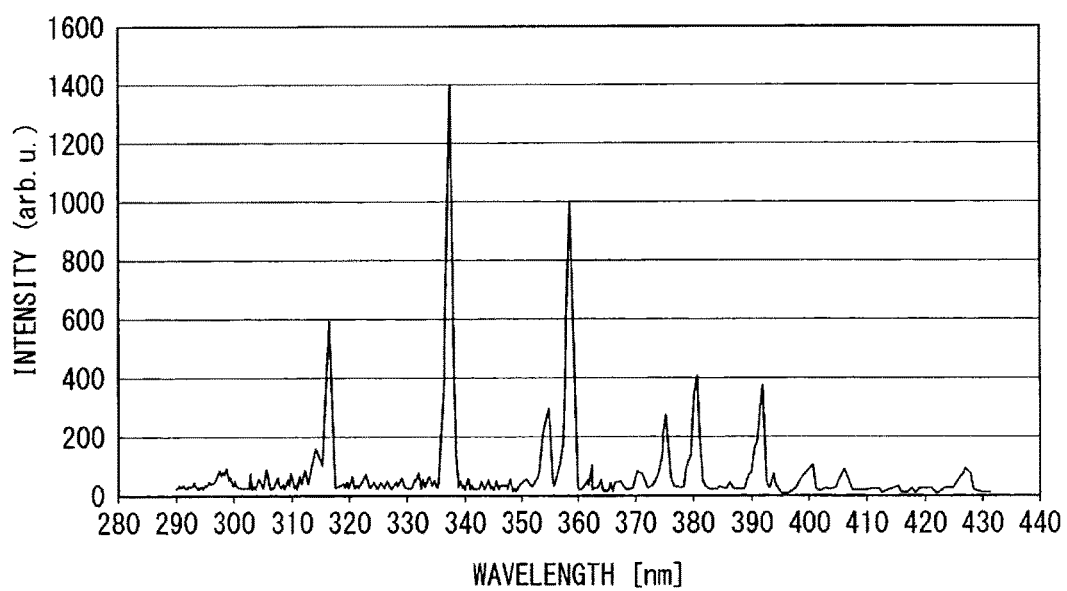
FIG. 3 is an explanatory view illustrating a luminous spectrum of nitrogen.

FIGS. 1 to 3 are explanatory views explaining a radiation detection apparatus and method thereof according to a first embodiment of the present invention. For details, FIG. 1 is a schematic view illustrating the radiation detection apparatus 10A that is an example of the radiation detection apparatus according to the first embodiment of the present invention. FIG. 2 is a schematic view illustrating another example of the radiation detection apparatus 10A. FIG. 3 is an explanatory view illustrating a luminous spectrum of nitrogen. It is noted that reference numeral 1 denotes "luminous region (light emission region)".

The radiation detection apparatus 10A includes, for example, a wavelength selecting unit 11, a polarization selecting unit (first polarization selecting unit) 12, an optical system 13, a photon detecting unit 14, an angle setting unit 15, a counting unit 16, and a display unit 17.

The wavelength selecting unit 11 is configured to select the luminous wavelength (emission wavelength) of nitrogen, caused by alpha rays. The wavelength selecting unit 11 passes nothing but light corresponding to the luminous wavelength of nitrogen to pass, and transmits the light passed therethrough to the polarization selecting unit 12, that is, the wavelength selecting unit 11 prevents lights except the light of which wavelength corresponds to luminous wavelength of nitrogen from passing therethrough.

The wavelength selecting unit 11 is configured by at least one type of a wavelength selecting element selected from an interferometric type, an absorption type, a diffraction type, and a scatter type. For example, the wavelength selecting unit 11 may have a band pass filter (BPF) that allows nothing but light of which wavelength corresponds to the luminous wavelength of nitrogen to pass through the wavelength selecting unit 11.

Here, nitrogen has several luminous wavelengths (emission wavelengths) such as 316, 337, 358, and 380 nanometers [nm] (FIG. 3). These luminous wavelengths are ultraviolet rays. The BPF applied to the wavelength selecting unit 11 passes at least one wavelength selected from 316, 337, 358, and 380 [nm], and may have a pass band which passes wavelengths other than the four luminous wavelengths as well as at least one wavelength selected from four luminous wavelengths.

The polarization selecting unit 12 is configured to arbitrarily select a polarization direction of the light passed through the wavelength selecting unit 11, the light having wavelength selected by the wavelength selecting unit 11. The polarization selecting unit 12 is configured by a polarizing element, such as a polarizing plate, a polarizing film, or polarizing prism, that selects (extracts) a linear polarization component of light.

The optical system 13 is configured to take an image which includes the light emission of nitrogen based on the linear polarization component extracted from the light passed through the polarization selecting unit 12, and is configured by an optical element or a plurality of optical elements. An optical element such as a convex mirror or lens, a concave mirror or lens, a parabolic mirror, or an aspheric (non-spherical) mirror or lens, or a combination thereof may be applied to the optical system 13.

It is noted that the optical system 13 may be arbitrarily configured by using various optical parts. For example, the optical system 13 may be a transmission-type optical system (illustrated in FIG. 1) that is configured by at least one optical lens 13a, a reflection-type optical system (illustrated in FIG. 2) that is configured by at least one optical reflector such as mirrors 13b1, 13b2, or a combination of optical parts selected from the transmission-type and reflection-type optical systems.

The photon detecting unit 14 is configured to detect whether a photon is present or absent with respect to each point of the luminous image by observing the luminous image of nitrogen excited by alpha rays of which the wavelength and the polarization direction are selected by the selecting units 11 and 12. The photon detecting unit 14 is configured by an optical sensor such as the photon detecting array 14a that is configured by optical sensing elements for detecting photons, arranged in a matrix.

The photon detecting array 14a is applied with the optical sensor such as a charge coupled device (CCD) having a cooling function, an electron multiplying CCD (EMCCD) having an electron multiplying function, an intensified CCD (ICCD), and a backside illumination (BSI) type CCD or CMOS (Complementary Metal Oxide Semiconductor) as a BSI type image sensor.

Along with the optical sensor, the photon detecting array 14a is also applied with a multi-pixel photon counter that is configured by avalanche photodiodes (APD) arranged in a matrix, or an optical sensor group (optical sensors) that is configured by arranging optical sensors such as photomultiplier tubes (PMT), PIN photodiodes, and avalanche photodiodes in a matrix.

Incidentally, it is not required that the optical sensor group be configured by arranging the same type (arbitrary one type) optical sensors in a matrix. For example, the optical sensor group may be configured by arranging two different types of optical sensors such as PMT and APD in a matrix. That is, the photon detecting array 14a may be applied with the optical sensor group that may be configured by arranging at least two different types of optical sensors in a matrix.

The angle setting unit 15 is configured to adjust and fix an angle between the optical system 13 and the photon detecting unit 14 to a desired angle value. For example, the angle setting unit 15 is configured by a rotation mechanism, a movement mechanism, or a combination of the rotation and movement mechanisms. The angle setting unit 15 adjusts and fixes the angle between the optical system 13 and the photon detecting unit 14 to a desired angle value by rotating or moving at least one of the optical element 13a, 13b1, 13b2 (FIGS. 1 and 2) by which the optical system 13 is configured and the photon detecting array 14a as the photon detecting unit 14.

The rotation mechanism or the movement mechanism, as the component of the angle setting unit 15, may applied with various driving mechanism which provides rotating or moving function to the angle setting unit 15. For example, the driving source of the driving mechanism can be selected from a force generating device such as a motor, a piezo element, or an electromagnet.

The counting unit 16 counts a pulse (pulse signal) output from each optical sensor of the photon detecting array 14a as the photon detecting unit 14, identifies the pulse derived from the light emission of gas excited by alpha rays based on a counting result, and calculates the number of alpha rays based on a result of counting the identified pulse.

Although the pulses (pulse signals) output from the photon detecting unit 14 includes noise pulses in addition to the pulses derived from the light emission of nitrogen excited by alpha rays, the counting unit 16 determines a peak value of the pulses input into the counting unit 16 is larger than a threshold value preset by user, and thereby determines whether an input pulse is generated by the light emission of nitrogen or by noise. That is, the counting unit 16 distinguishes between the light emission of nitrogen and noise based on the determination whether the peak value is larger than the threshold value or not.

If the peak value of the input pulse is larger than the threshold value, the counting unit 16 considers the input pulse as a luminous pulse of nitrogen excited by alpha ray, and counts the number of the input pulses considered as the luminous pulses. Meanwhile, if the peak value of the input pulse is not larger than the threshold value preset by user, the counting unit 16 considers the input pulse as noise, and takes no account of the input pulse. That is, the counting unit 16 does not count the number of the input pulses of which the peak value is not larger than the threshold value.

The counting unit 16 is, for example, configured by an analog circuit, a digital circuit, a counting circuit combined by the analog circuit and the digital circuit, or a general calculator (hardware such as computer) installed with a program (software) to count pulses.

The display unit 17 has an image displaying function, and displays the luminous image of nitrogen excited by alpha rays based on the number counted by the counting unit 16. The display unit 17 is configured by a display device such as a liquid crystal display (LCD), a cathode-ray tube (CRT), and an organic light emitting display (OLED).

The display unit 17 displays an analog or digital value which corresponds to the pulse light emission number of nitrogen detected by each photon detecting array 14a as the photon detecting unit 14, the number counted by the counting unit 16. Further, the display unit 17 converts the pulse light emission number of nitrogen by the counting unit 16 into a color-notation in accordance with the pulse light emission number, and displays the conversion result on a screen (two-dimensional screen) of the display device such as LCD.

Next, acts steps (procedure) of the radiation detection apparatus 10A will be described.

There is a case where alpha nuclides may be present in a region (which will hereinafter be referred to as "observation region") in which the radiation detection apparatus 10A can observe light emission of gas excited by alpha rays. In this case, if the alpha nuclide emits alpha rays in the observation region, the alpha rays excite nitrogen which is present in atmosphere, and located within 50 [nm] from surface of the alpha nuclide. When the nitrogen is excited by alpha rays, ultra-weak pulse ultraviolet light (ultraviolet ray) is emitted. The ultra-weak pulse ultraviolet light has emission lines (luminous wavelengths) such as 316, 337, 358, and 380 [nm]. The pulse ultraviolet light isotropically emits from a luminous point (emitting point) which is located adjacent to the surface of the alpha nuclide.

Figure 4A:
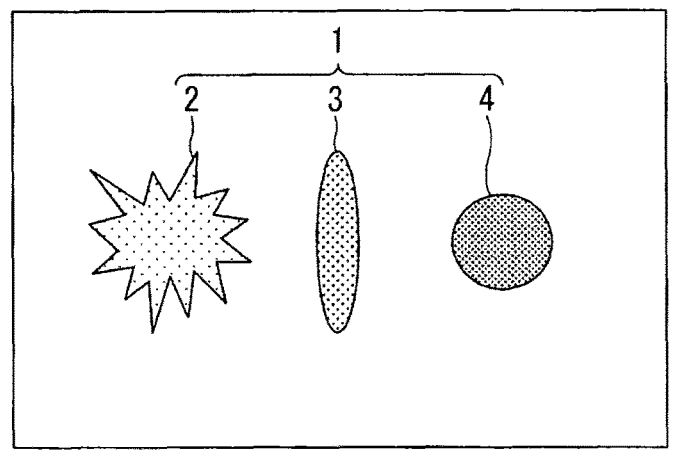
FIG. 4A is a schematic view illustrating an example of real situation of an observation region including a light emitting region.
Figure 4B:
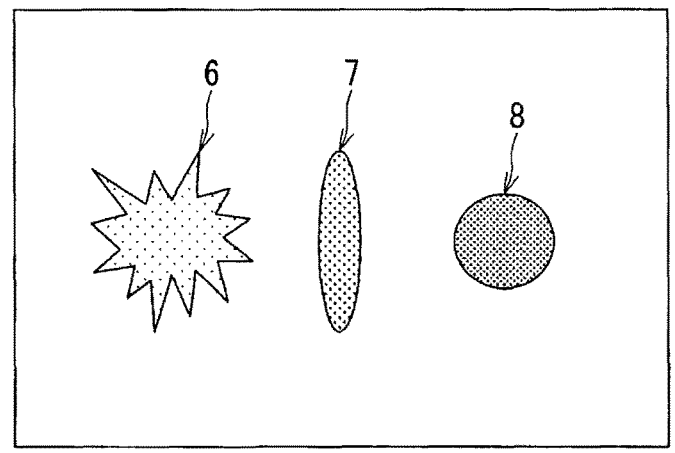
FIG. 4B is a schematic view illustrating an observation image of the observation region.
Figure 4C:
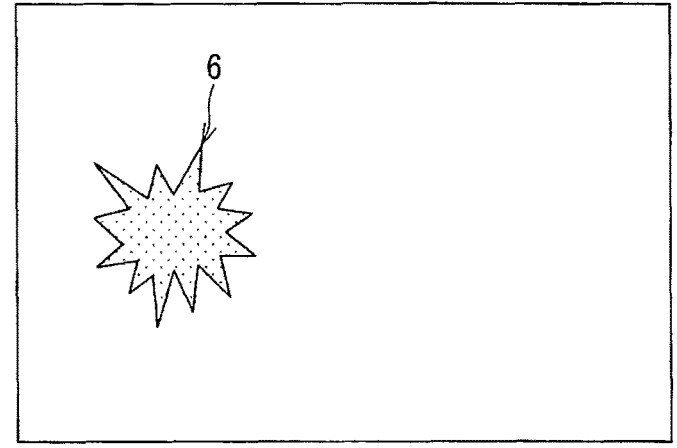
FIG. 4C is a schematic view illustrating a display image displayed on a display device.

FIG. 4A is a schematic view illustrating an example of real situation of the observation region including the light emitting region 1, FIG. 4B is a schematic view illustrating an observation image of the observation region, and FIG. 4C is a schematic view illustrating a displayed image displayed on the display device.

As illustrated in FIG. 4A, the light emitting region 1 usually includes a bright region (which will hereinafter be referred to as "reflected light region") 3 at which sun light or illumination light is reflected, and a direct light region 4 in which a direct light of an illuminator such as a light emitting diode (LED), an incandescent lamp, or a fluorescent lamp is present in addition to a region (which will hereinafter be referred to as "ultraviolet region") 2 in which the luminous pulse (pulse light) being the ultraviolet ray pulse is emitted.

The radiation detection apparatus 10A observes the entire light emitting region 1 which includes the reflected light region 3 and the direct light region 4 as well as the ultraviolet region 2. In other words, the light which enters the radiation detection apparatus 10A includes the reflected light in the reflected light region 3 and the direct light in the direct light region 4 in addition to the ultraviolet light derived from the light emission of the nitrogen excited in the ultraviolet region 2.

The light which enters the radiation detection apparatus 10A passes through the wavelength selecting unit 11, the polarization selecting unit 12, and the optical system 13, and is received by the photon detecting array 14a. The photon detecting array 14a observes (measures) an image (which will be hereinafter referred to as "observation image" and corresponds to FIG. 4B) of the observation region including the luminous region 1 (which corresponds to FIG. 4A).

In the radiation detection apparatus 10A, at first, a step of selecting the wavelength of a light which passes the wavelength selecting unit 11 is performed by the wavelength selecting unit 11. In the wavelength selecting step, the wavelength selecting unit 11 eliminates light which has wavelengths other than the luminous wavelength of nitrogen from the light which enters the radiation detection apparatus 10A, and thereby allows nothing but light of the luminous wavelength of nitrogen to pass through the wavelength selecting unit 11.

Subsequently, a step of selecting a polarization direction of light which passes the polarization selecting unit 12 is performed by the polarization selecting unit 12. In the polarization direction selecting step, the polarization selecting unit 12 eliminates light which has polarization directions other than a polarization direction set by a user from the light passed through the wavelength selecting unit 11, and thereby selects (extracts) the linear polarization component from the light passed through the polarization selecting unit 12.

Subsequently, a step of taking the image which includes the light emission of nitrogen based on the linear polarization component extracted from the light passed through the polarization selecting unit 12 is performed by the optical system 13. In the imaging step, the optical system 13 takes the image which includes the light emission of nitrogen, and transmits the luminous image to the photon detecting unit 14.

Subsequently, a step of detecting the photons in the luminous image transmitted from the optical system 13 is performed by the photon detecting unit 14. The photon detecting unit 14 receives the luminous image transmitted from the optical system 13 in the photon detecting array 14a, and then detects whether a photon is present or not with respect to each point of the luminous image.

The reason why the radiation detection apparatus 10A includes the polarization selecting unit 12 is that the reflected light and the direct light may not be sufficiently eliminated from the observed light. If the reflected light such as sun light or various illumination light, or the direct light of an illuminator such as the LED, the incandescent lamp, or the fluorescent lamp is weak, the reflected light and the direct light may be sufficiently eliminated from the observed light even if the radiation detection apparatus 10A only includes the wavelength selecting unit 11. However, if the reflected light or the direct of illuminator is strong, in a case where the radiation detection apparatus 10A only includes the wavelength selecting unit 11, it may be difficult to sufficiently eliminate the reflected light and the direct light from the observed light. In this case, the polarization selecting unit 12 is useful in terms of eliminating strong noise light such as the reflected light and/or the direct light.

In the radiation detection apparatus 10A, the polarization selecting unit 12 observes the observation region with selecting the polarization directions, and measures light intensity in each of region 2, 3, and 4 of the observation region. Here, although the emission light of nitrogen and the directed light of the illuminator have even polarization of the polarized light, the reflected light has uneven polarization of the polarized light. Therefore, if the polarization selecting unit 12 changes the polarization direction of light to be observed, intensity of the reflected light having uneven polarization of the polarized light.

In such way, if the radiation detection apparatus 10A determines whether the polarization direction of the light to be observed which includes the emission light, the directed light, and the reflected light is even or not (uneven), the radiation detection apparatus 10A can determine the reflected light region 7 in the observation image (FIG. 4B) observed by the photon detecting array 14a. For details, since there is a region in which light intensity is changed before or after the polarization selecting unit 12 changes the polarization direction of light to be observed, the region can be determined as the reflected light region 7.

If the observation image (FIG. 4B) is observed by an imaging device such as a camera including an imaging element such as a CCD or CMOS, or visually observed, the direct light region 8 (FIG. 4B) in the observation image can be determined as light emission of the direct light, i.e., noise light.

As a result, the reflected light region 7 (FIG. 4B) and the direct light region 8 (FIG. 4B) in the observation image can be determined as noise. Meanwhile, the ultraviolet region 6 (FIG. 4B) in the observation image can be determined as a region in which the pulse ultraviolet light is emitted from nitrogen excited by alpha ray. Therefore, the radiation detection apparatus 10A can determine that alpha nuclides are present in the ultraviolet region 2 (FIG. 4A) of the observation region.

In such a way, since the counting unit 16 counts the pulse ultraviolet light which is emitted from the excited nitrogen observed in the photon detecting array 14a, i.e., the counting step is performed by the counting unit 16, the radiation detection apparatus 10A can calculate the number of alpha ray and the radiation activity of the alpha nuclide based on the result of counting the identified pulse.

The display unit 17 displays a distribution of the alpha nuclide which corresponds to a distribution of the pulse light emission number (the number counted by the counting unit 16) as the ultraviolet region 6 (FIG. 4C) thereon. Here, each region 6, 7, and 8 (FIG. 4B) in the observation image which is the image of the observation region respectively corresponds to the each region 2, 3, and 4 (FIG. 4A). When the alpha nuclide distribution is displayed on the display unit 17, background light (noise light) which corresponds to the regions 7 and 8 (FIG. 4B) in the observation image is eliminated from the observation image, whereby the display unit 17 can display the displayed image (FIG. 4C) obtained by eliminating the noise light in the regions 7 and 8 from the observation image (FIG. 4B) including the regions 6, 7, and 8, the displayed image which does not include the noise light in the regions 7 and 8.

Namely, the radiation detection apparatus 10A above-described as the example of the radiation detection apparatus according to first embodiment observes the observation region with selecting the polarization direction of light passed through the wavelength selecting unit 11, measures change amounts of light intensity in the observation region including the each region 2, 3, and 4 (FIG. 4A), and thereby identifies a region in which the light intensity is changed if the polarization selecting unit 12 changes the polarization direction which is presently selected as the reflected light region 3.

However, the radiation detection apparatus 10A as another example of the radiation detection apparatus according to first embodiment may change a field of view (FOV) of the photon detecting array 14a when the observation region is observed. In the case where the FOV of the photon detecting array 14a is changed, since the angle setting unit 15 changes the angle between the optical system 13 and the photon detecting unit 14, an incident angle of the light passed through the wavelength selecting unit 11 is changed, whereby the reflection angle of the reflected light in the reflected light region 3 is also changed. Therefore, the radiation detection apparatus 10A as another example can also identify the reflected light region 3 by measuring the change amounts of light intensity in the each region 2, 3, and 4.

That is, the angle setting unit 15 changes the angle between the optical system 13 and the photon detecting unit 14 so as to change the FOV of the photon detecting array 14a, whereby the reflection angle of the reflected light in the reflected light region 3 is changed. Thus, the reflected light region 3 can be identified in the case where the FOV of the photon detecting array 14a is changed as well as the case where the polarization selecting unit 12 changes the polarization direction which is presently selected.

According to the radiation detection apparatus 10A and the radiation detection method thereof (i.e., the radiation detection method including the steps performed by the radiation detection apparatus 10A), the reflected light such as sunlight or various illumination light in the reflected light region 3 and the direct light of illuminator such as the LED in the direct light region 4 can be identified. For details, in the radiation detection apparatus 10A, while the polarization direction is changed or the FOV of the photon detecting array 14a is changed, the photon detecting array 14a receives the light which may include the reflected light and the direct light. If there may be a region in which the light intensity is changed when the polarization direction is changed or the FOV of the photon detecting array 14a is changed, the radiation detection apparatus 10A identifies the region in which the light intensity is changed as the reflected light region 3.

Meanwhile, as to the direct light region 4, if user only observes the observation region, the user can easily identify the direct light in the direct light region 4. Therefore, if the observation region is observed by a user in visual contact or by the imaging device, the direct light in the direct light region 4 can be identified.

Therefore, according to the radiation detection apparatus 10A and radiation detection method thereof, even if background light as noise light (e.g. the reflected light in the reflected light region 3 and the direct light in the direct light region 4) is strong, it is possible to identify the image of the ultraviolet region 6 in which the pulse ultraviolet ray of nitrogen excited by alpha ray is emitted with high accuracy from the regions 6, 7, and 8 included in the observation image (FIG. 4B), and therefore to identify the ultraviolet region 2 (FIG. 4A) in which the alpha nuclide is present from whole range of the observation region.

Although, as an example of the radiation detection apparatus 10A, the radiation detection apparatus 10A including the angle setting unit 15 and the display unit 17 is described above, the radiation detection apparatus 10A may not include the angle setting unit 15 and/or the display unit 17. That is, it is only necessary that the radiation detection apparatus 10A includes the wavelength selecting unit 11, the polarization selecting unit 12, the optical system 13, the photon detecting unit 14, and the counting unit 16.

The radiation detection apparatus 10A that includes the wavelength selecting unit 11, the polarization selecting unit 12, the optical system 13, the photon detecting unit 14, the angle setting unit 15, and the counting unit 16 identifies the reflected light, thereby adjusting polarization direction selected by the polarization selecting unit 12 without changing FOV of the photon detecting array 14a. If a display device is connected with a machine interface that connects with external devices, the display device displays the counting number of the emission pulse of nitrogen gas, counted by the counting unit 16 therein.

Further, as one example, although the radiation detection apparatus 10A described above observes the light emission of nitrogen gas, it is not required that the radiation detection apparatus 10A observes the light emission of nitrogen gas. In the radiation detection apparatus according to embodiments of the present invention, provided that the light emission of gas excited by alpha ray can be observed, the gas of which the light emission is observed may be arbitrarily selected.

Furthermore, in a case where user would like to observe the light emission of gas excited by alpha ray, the gas which causes light emission to be observed may be injected in the atmosphere, and thereby purge gases other than the injected gas from the atmosphere. For example, if user injects a gas such as argon (Ar) gas into the atmosphere, the gas being excited by alpha rays and thereby causing effective light emission, the argon gas purges nitrogen gas from the atmosphere, whereby the atmosphere is filled with the argon gas. Under the condition that the atmosphere is filled with the argon gas, the user may be possible to observe more effective light emission of argon gas excited by alpha rays than that of nitrogen gas.

Second Embodiment

Figure 5:
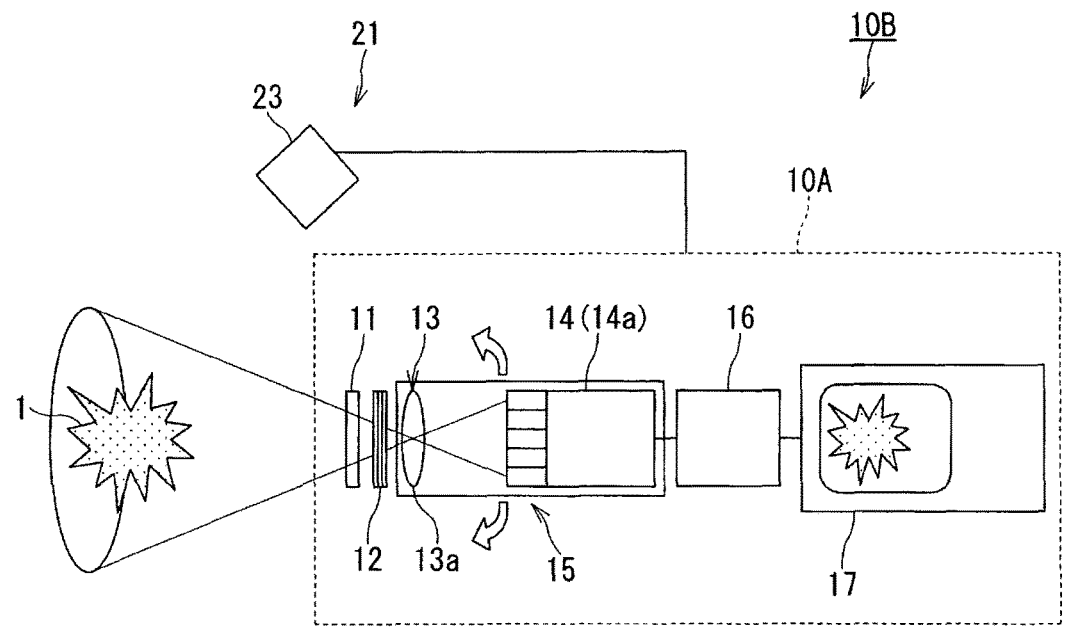
FIG. 5 is a schematic view illustrating an example of a radiation detection apparatus according to second embodiment of the present invention.

FIG. 5 is a schematic view illustrating a radiation detection apparatus and method thereof according to second embodiment of the present invention. For details, FIG. 5 is a schematic view illustrating a configuration of a radiation detection apparatus 10B that is an example of the radiation detection apparatus according to second embodiment of the present invention.

Since the radiation detection apparatus 10B is configured as the same component as in the radiation detection apparatus 10A with the exception of a light projecting unit 21, the light projecting unit 21 will be mainly described. Thus, in description of the second embodiment, the same reference numerals or characters in the radiation detection apparatus 10B are assigned to the same or similar components and parts as those in the radiation detection apparatus 10A, and the duplicated description thereof is omitted.

The radiation detection apparatus 10B includes, for example, the wavelength selecting unit 11, the polarization selecting unit 12, the optical system 13, the photon detecting unit 14, the angle setting unit 15, the counting unit 16, the display unit 17, and the light projecting unit 21.

The light projecting unit 21 is configured to project (radiate) the polarized light to the light emitting region 1 of pulse ultraviolet rays, and improves visibility of the light emitting region 1 when the observation region including the light emitting region 1 is observed by a user in visual contact or by the imaging device. The light projecting unit 21 is configured by a polarized light source 23 such as laser diode (LD), light emitting diode (LED), and laser source, the polarized light source 23 radiating polarized light.

In the radiation detection apparatus 10B, since the light projecting unit 21 (which corresponds to the polarized light source 23 illustrated in FIG. 5) performs a step (which will be referred to as "projecting step") for projecting the polarized light to at least the ultraviolet region 2 of the each region 2, 3, and 4 in the light emitting region 1, the radiation detection apparatus 10B further performs the projecting step in addition to steps performed by the radiation detection apparatus 10A. Incidentally, since the steps performed by the radiation detection apparatus 10B are the same steps as the steps performed by the radiation detection apparatus 10A with the exception of the projecting step, the projecting step will be mainly described in following description of the steps performed by the radiation detection apparatus 10B.

In the projecting step, when the light projecting unit 21 projects the polarized light to the observation region, at least one unit of the light projecting unit 21 and the polarization selecting unit 12 is adjusted and fixed so that the polarization direction of the light projected by the light projecting unit 21 is perpendicular to the polarization direction selected by the polarization selecting unit 12. In a case where the polarization direction of the light projected by the light projecting unit 21 is perpendicular to the polarization direction selected by the polarization selecting unit 12, since the reflected light is completely eliminated from the observation region, the reflected light region 7 in the observation image (FIG. 4B) can be completely distinguished. That is, the radiation detection apparatus 10B can obtain the observation image which does not include the reflected light region 7.

Further, since the radiation detection apparatus 10B allows the light projecting unit 21 to project the polarized light, the radiation detection apparatus 10B is possible to improve visibility of the observation region, and thereby enables a user in visual contact to easily observe the observation image (FIG. 4B) or by the imaging device such as the camera including the imaging element. As a result, it becomes easy for the user to identify the direct region 8 (FIG. 4B) in the observation image.

According to the radiation detection apparatus 10B and the radiation detection method thereof (i.e., the radiation detection method including the steps performed by the radiation detection apparatus 10B), the radiation detection apparatus 10B includes the light projecting unit 21 that projects the polarized light, and can thereby project the polarized light to the observation region including the ultraviolet region 2 in which the pulse ultraviolet light derived from the excited nitrogen is emitted. When the light projecting unit 21 projects the polarized light to the ultraviolet region 2, if at least one unit of the light projecting unit 21 and the polarization selecting unit 12 is adjusted and fixed so that the polarization direction of the light projected by the light projecting unit 21 is perpendicular to the polarization direction selected by the polarization selecting unit 12, the reflected light is completely eliminated from the observation region.

Further, in the radiation detection apparatus 10B and the radiation detection method thereof, since the radiation detection apparatus 10B allows the light projecting unit 21 to project the polarized light, the radiation detection apparatus 10B is possible to improve visibility of the observation region, and thereby enables user to make it easy to visibly observe the observation image (FIG. 4B) or observe the observation image by the imaging device such as the camera including the imaging element. As a result, it becomes easy for the user to identify the direct region 8 (FIG. 4B) in the observation image.

Namely, although the radiation detection apparatus 10B that includes the light projecting unit 21 provided with the polarized light source 23 is above-described as the example of the radiation detection apparatus according to second embodiment, it is not always required that the polarized light source 23 is applied to the light projecting unit 21. The light projecting unit 21 as a whole may have only to project the polarized light to the observation region. In other words, in the radiation detection apparatus 10B, the light projecting unit 21 may not be provided with the polarized light source 23.

Figure 6:
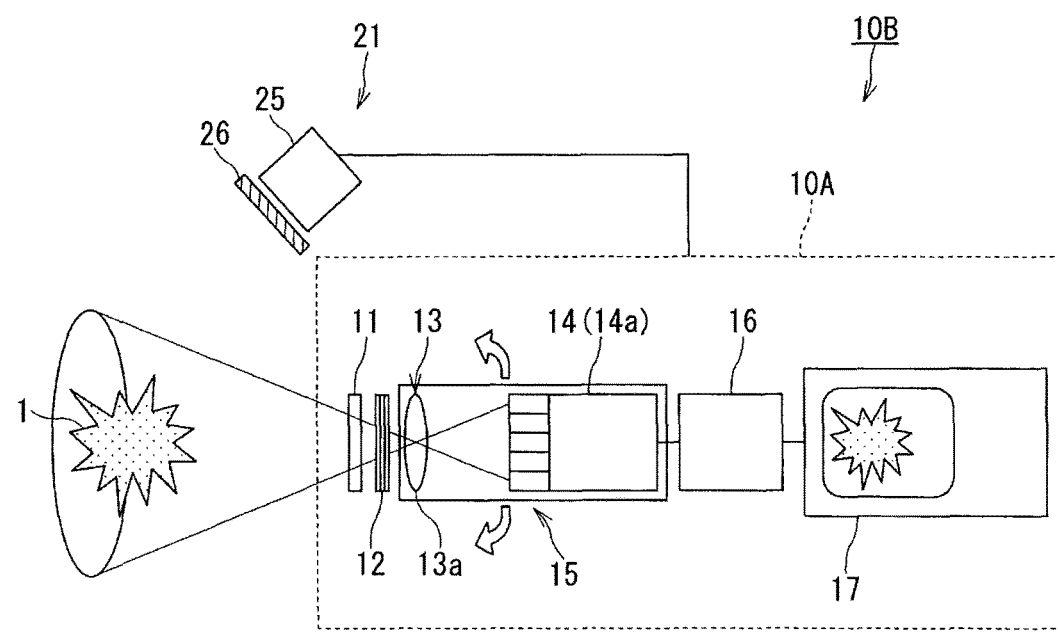
FIG. 6 is a schematic view illustrating another example of the radiation detection apparatus according to second embodiment of the present invention.

FIG. 6 is a schematic view illustrating configuration of a radiation detection apparatus 10B that is another example of the radiation detection apparatus according to second embodiment of the present invention.

Although the polarized light source 23 is provided to the light projecting unit 21 in the radiation detection apparatus 10B illustrated in FIG. 5, as illustrated in FIG. 6, instead of the polarized light source 23, a configuration including a non-polarized light source 25 and a polarization selecting unit (second polarization selecting unit) 26 may be provided to the light projecting unit 21.

Here, the non-polarized light source 25 is configured to radiate a non-polarized light. For example, the non-polarized light source 25 may be selected from an illuminator that radiates a non-polarized light, such as a flashlamp, the fluorescent lamp, or a super luminescent diode (SLD). The polarization selecting unit 26 is configured to pass through a light in a predetermined direction which is perpendicular to a propagating direction of the non-polarized light emitted from the non-polarized light source 25, and extracts a linear polarization component corresponding to a light component in the predetermined direction from the non-polarized light.

As described above, even if the non-polarized light source 25 and the polarization selecting unit 26 are provided to the light projecting unit 21, the light projecting unit 21 as a whole can project the polarized light to the ultraviolet region 2 as is the case in the polarized light source 23 provided to the light projecting unit 21.

Third Embodiment

Figure 7:
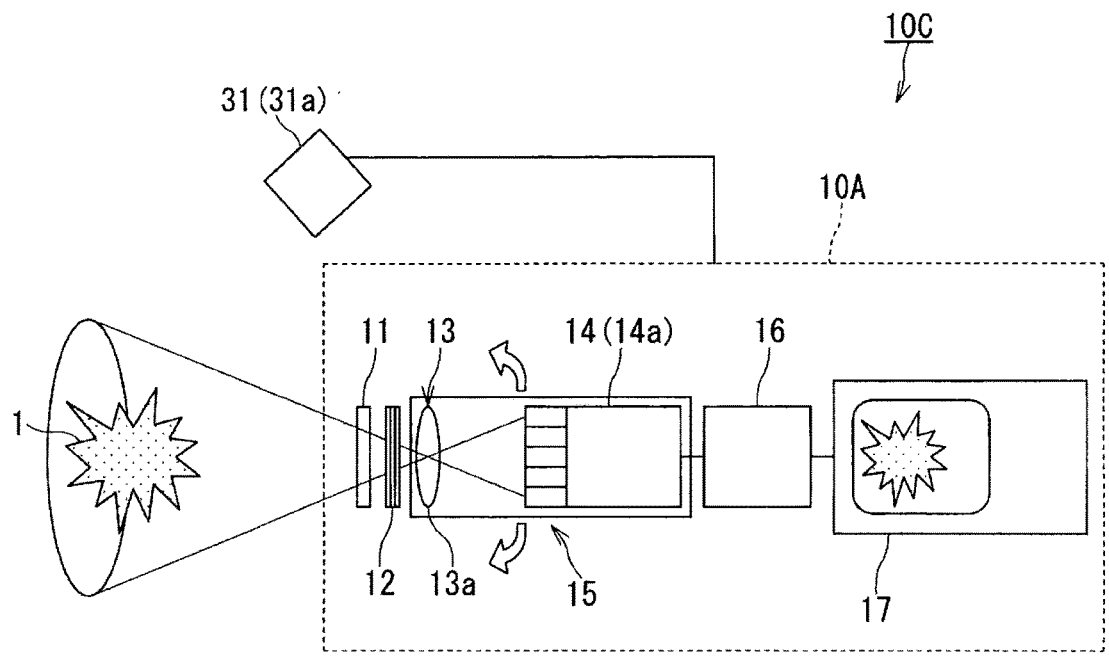
FIG. 7 is a schematic view illustrating an example of a radiation detection apparatus according to third embodiment of the present invention.
Figure 8:
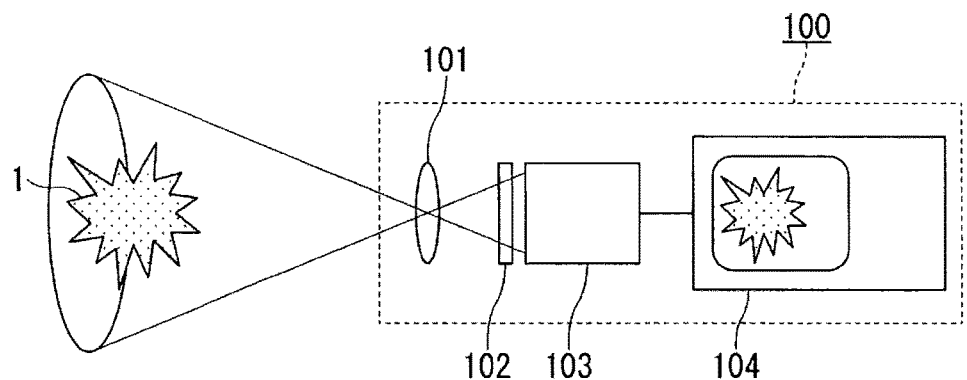
FIG. 8 is an explanatory view illustrating a configuration example of conventional radiation detection apparatus that detects alpha ray by observing luminous image of nitrogen.

FIG. 7 is a schematic view illustrating a radiation detection apparatus and method thereof according to a third embodiment of the present invention. For details, FIG. 7 is a schematic view illustrating configuration of a radiation detection apparatus 10C that is an example of the radiation detection apparatus according to a third embodiment of the present invention.

Since the radiation detection apparatus 10C is configured as the same component as in the radiation detection apparatus 10A with the exception of a gamma ray detecting unit 31, the gamma ray detecting unit 31 will be mainly described. Thus, in description of the third embodiment, the same reference numerals or characters in the radiation detection apparatus 10C are assigned to the same or similar components and parts as those in the radiation detection apparatus 10A, and the duplicated description thereof is omitted.

The radiation detection apparatus 10C includes, for example, the wavelength selecting unit 11, the polarization selecting unit 12, the optical system 13, the photon detecting unit 14, the angle setting unit 15, the counting unit 16, the display unit 17, and the gamma ray detecting unit 31.

The gamma ray detecting unit 31 is configured to detect gamma rays present in the same region as a region in which the photon detecting array 14a detects photons.

For example, the gamma ray detecting unit 31 is configured by a gamma ray detecting array 31a that observes the same region as the region in which the photon detecting array 14a detects photons. Here, for example, the gamma ray detecting array 31a is configured by arranging the gamma ray detecting element such as semiconductor detector, that images a gamma ray distribution, observing the gamma ray distribution image, and thereby detecting gamma ray in the gamma ray distribution image in a matrix.

The gamma ray detecting array 31a is configured to have the same field of view (FOV) range as the FOV range of the photon detecting array 14a that observes the luminous image of nitrogen gas excited by alpha rays.

In the radiation detection apparatus 10C, the gamma ray detecting array 31a performs a step (which will be referred to as "gamma ray detecting step") for imaging the gamma ray distribution, observing the imaged gamma ray distribution, and thereby detecting gamma rays in the imaged gamma ray distribution, and the counting unit 16 performs a step (which will be referred to as "noise eliminating step") for eliminating (excluding) noise pulse (which will be referred to as "gamma ray noise") derived from gamma rays detected in the gamma ray detecting step from the pulses counted by the counting unit 16 in each region 6, 7, and 8 of the observation image (FIG. 4B). That is, the radiation detection apparatus 10C further performs the gamma ray detecting step and the noise eliminating step in addition to steps performed by the radiation detection apparatus 10A.

If the radiation detection apparatus that detects an alpha ray by observing the luminous image of gas excited by the alpha ray is used for detecting the alpha ray, a region indicating a light emission derived from alpha nuclide in the observation image (FIG. 4B) may also include a region indicating the gamma ray noise. Thus, the gamma ray detecting step and the noise eliminating step are performed for the sake of detecting an alpha ray with higher accuracy.

Incidentally, since a third radiation detecting procedure performed by the radiation detection apparatus 10C is different from the first radiation detecting procedure performed by the radiation detection apparatus 10A in that the third radiation detecting procedure further includes the gamma ray detecting step and the noise eliminating step. The gamma ray detecting step and the noise eliminating step will be mainly described in following description.

In the gamma ray detecting step, the gamma ray detecting array 31a detects the gamma ray noise in the same region as the region in which the photon detecting array 14a detects the photon. The gamma ray noise may be emerged as some bright points which are flashing in the displayed image (FIG. 4C) or the ultraviolet region 6 (FIG. 4C) in the displayed image. Regardless of whether the gamma ray noise is emerged as some bright points which are flashing or the ultraviolet region 6, in the displayed image, the gamma ray detecting array 31a can determine whether a gamma ray noise exists or not on the basis of a gamma ray noise detection result of the gamma ray detecting array 31a.

In the noise elimination step, if the gamma ray detecting unit 31 determines that a noise caused by gamma rays is included in the ultraviolet region 6 illustrated in FIG. 4C, the noise is eliminated by the gamma ray detecting unit 31.

According to the radiation detection apparatus 10C and the radiation detection method thereof (i.e., the radiation detection method including the steps performed by the radiation detection apparatus 10C), since the radiation detection apparatus 10C includes the gamma ray detecting unit 31, the radiation detection apparatus 10C identifies noise light emission caused by gamma rays in the light emitting region 1. As a result, the radiation detection apparatus 10C identifies the image of the ultraviolet region 6 in which the pulse ultraviolet ray of nitrogen excited by alpha rays is emitted with high accuracy from the observation image (FIG. 4B) including the regions 6, 7, and 8 (which respectively corresponds to the regions 2, 3, and 4 of the light emitting region 1 (FIG. 4A)).

It is noted that although an example in which the radiation detection apparatus 10C is configured by further including the gamma ray detecting unit 31 in addition to the radiation detection apparatus 10A has been illustrated in FIG. 7, the radiation detection apparatus 10C may be configured by further including the gamma ray detecting unit 31 in addition to the radiation detection apparatus 10B. In other words, the radiation detection apparatus 10C may be configured by further including the light projecting unit 21 and the gamma ray detecting unit 31 in addition to the radiation detection apparatus 10A.

As described above, according to the radiation detection apparatuses 10A, 10B, and 10C, and the radiation detection method thereof, even if background light as noise light (e.g. the reflected light in the reflected light region 3 and the direct light in the direct light region 4) is strong, it is possible to identify the image of the ultraviolet region 6 in which the pulse ultraviolet ray of nitrogen excited by alpha rays is emitted with high accuracy from the regions 6, 7, and 8 included in the observation image (FIG. 4B), and therefore to identify the ultraviolet region 2 (FIG. 4A) in which the alpha nuclide is present from the entire observation region.

Further, according to the radiation detection apparatus 10B and the radiation detection method thereof, since the polarized light can be projected to the observation region including the ultraviolet region 2 in which the pulse ultraviolet ray of nitrogen excited by alpha ray is emitted, the visibility of the observation region can be improved. The improvement of the visibility in the observation region makes it easy to identify the direct region 8 (FIG. 4B) in the observation image by observing the observation image by a user in visual contact or by the imaging device such as the camera including the imaging element.

Moreover, according to the radiation detection apparatus 10C and the radiation detection method thereof, since the radiation detection apparatus 10C identifies noise light emission caused by gamma rays in the light emitting region 1, the radiation detection apparatus 10C identifies the image of the ultraviolet region 6 in which the pulse ultraviolet ray of nitrogen excited by alpha rays is emitted with high accuracy from the image of the light emitting region 1 in the observation image.

It is noted that the present invention is not limited to the above-described embodiments as they are and, in an implementation phase, can be embodied in various forms other than the specific embodiments described above. Various omissions, additions, substitutions, and changes may be made without departing from the spirit and scope of the invention. These embodiments and modifications thereof are included within the sprit and scope of the invention and are included within the scope of the invention as disclosed in the claims and equivalents thereof.

What is claimed is:
1. A radiation detection apparatus comprising:
a wavelength selecting unit configured to pass light having a selected wavelength when a light emission is produced by excitation of a gas by an alpha ray;
a first polarization selecting unit configured to receive the light from the wavelength selecting unit, to select a polarization direction, and to pass light of the selected polarization direction;
an optical system configured to form an image of the light passed through the wavelength selecting unit and the first polarization selecting unit;
a photon detecting unit configured to detect photons in the image formed by the optical system;
a counting unit configured to identify each of the photons detected by the photon detecting unit that are larger than a threshold value as a photon derived from the light emission of gas excited by the alpha ray count the identified photons, and calculate the number of the alpha rays based on a result of counting the identified photons; and
a polarized light projecting unit configured to project polarized light having a polarization direction perpendicular to the polarization direction selected by the first polarization selecting unit.

2. The radiation detection apparatus according to claim 1, wherein the first polarization selecting unit is configured to select a first polarization direction and a second polarization direction,
   wherein the optical system is configured to form a first image in a first case where the first polarization selecting unit selects the first polarization direction and a second image in a second case where the first polarization selecting unit selects the second polarization direction,
   wherein the photon detecting unit is configured to detect the photons in the first image and the photons in the second image, and
   wherein the counting unit is configured to use a difference value as the value obtained from the result of counting the detected photons, the difference value being between the number of the detected photons in the first image and the number of the detected photons in the second image.

3. The radiation detection apparatus according to claim 1, further comprising an angle setting unit configured to adjust and fix an angle between the optical system and the photon detecting unit to desired angle value by rotating or moving at least one of the optical system and the photon detecting unit.

4. The radiation detection apparatus according to claim 1, wherein the polarized light projecting unit includes a polarized light source configured to radiate the polarized light.

5. The radiation detection apparatus according to claim 1, wherein the polarized light projecting unit includes a light source configured to radiate a non-polarized light, and a second polarization selecting unit configured to allow a light in a predetermined direction to pass through the second polarization selecting unit, the predetermined direction being perpendicular to both the polarization direction selected by the first polarization selecting unit and a propagating direction of the non-polarized light radiated from the light source.

6. The radiation detection apparatus according to claim 1, wherein the photon detecting unit comprises an optical sensing element configured to detect the photons in a matrix.

7. The radiation detection apparatus according to claim 6, wherein the optical sensing element is selected at least one type from a CCD that has cooling function, an EMCCD that has electron multiplying function, an ICCD, a back side illumination type image sensor, and a MPPC.

8. The radiation detection apparatus according to claim 6, wherein the optical sensing element is selected at least one type from the photodetector selected from a photomultiplier tube, a PIN photodiode, and an avalanche photodiode.

9. A radiation detection method comprising:
   selecting a wavelength associated with light emitted when a gas is excited by an alpha ray;
   selecting a first polarization direction;
   forming an image of a light having the selected wavelength and the selected polarization direction selected from the light emitted by the excited gas;
   detecting at least one photon in the image formed;
   identifying each of said at least one photon detected in the detecting step having an intensity larger than a threshold value as a photon derived from the light emitted by the excited gas;
   counting each of the identified photons;
   calculating the number of the alpha ray based on a result of the counting each of the identified photons; and
   further comprising projecting a polarized light to a region in which the light is emitted by the excited gas,
   wherein the polarization direction includes a first polarization direction, and
   wherein the polarized light has a second polarization direction which is perpendicular to both a propagating direction of the polarized light and the first polarization direction.

10. The radiation detection method according to claim 9, further comprises selecting a second polarization direction, and wherein the value obtained from a result of counting each of the detected photons is a difference between the number of the detected photons when the first polarization direction is selected and the number of the detected photons when the second polarization direction is selected.

11. The radiation detection method according to claim 9, wherein the polarized light projecting step includes projecting a non-polarized light from a light source and allowing a light component in a second polarization direction of the non-polarized light to pass through a polarization selecting unit that selects the second polarization direction, thereby obtaining the polarized light of which polarization direction is the second polarization direction from the non-polarized light.

* * * * *